April 29, 1952 E. B. MOULLIN 2,594,971

BARRIER NONREFLECTANT TO INCIDENT ELECTROMAGNETIC WAVES

Filed March 9, 1945

INVENTOR
Eric Balliol Moullin

By Norris & Bateman

ATTORNEYS

Patented Apr. 29, 1952

2,594,971

UNITED STATES PATENT OFFICE 2,594,971

BARRIER NONREFLECTANT TO INCIDENT ELECTROMAGNETIC WAVES

Eric Balliol Moullin, Sale, England, assignor, by mesne assignments, to General Electric Company, a corporation of New York Application March 9, 1945, Serial No. 581,919
In Great Britain March 12, 1943

Section 1, Public Law 690, August 8, 1946
Patent expires March 12, 1963

1 Claim. (Cl. 343—18)

Figure 1C:
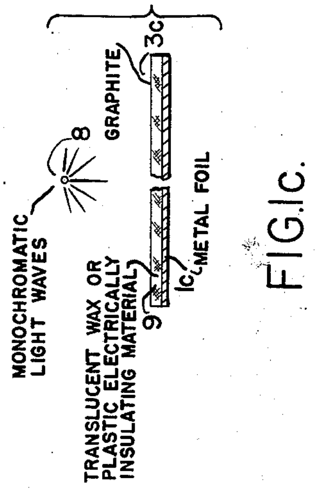

This invention relates to arrangements for impeding reflection of electromagnetic "aether" waves in general, and more particularly light and radio waves, from objects in their path.

The nature of, and general principles involved in, the invention can best be explained from a first consideration mainly of the conditions involved when a transmitter of electromagnetic radio waves is disposed in a closed room or other chamber. In such circumstances, if the walls of the chamber are constructed of metal, then there will be no escape of the electromagnetic waves into space outside the chamber; in the parlance of geometrical optics the waves are reflected by the metal walls back into the chamber. The reflected waves intermingle with the outgoing waves and produce a distribution of electric field within the chamber which differs materially from what would obtain in that region of space if the chamber walls were removed. In the parlance of physical optics a system of stationary waves is set up inside the chamber. The explanation of the phenomenon in electrical terms is that the radiations from the radio transmitter within the chamber cause currents to be induced in the walls of the chamber, and the electric field set up inside the chamber is the resultant of the field which the transmitter would produce in the absence of the chamber together with the field which the currents, induced in the walls by the radiations from the transmitter, would produce in the absence of the transmitter. The same may be said also as regards the space outside the chamber, but there, the resultant has zero value everywhere, if the walls are perfectly conducting, since the induced current will have just that magnitude which will make the resultant electric field zero at the surface of the perfectly conducting walls; moreover, the resultant field must remain zero through the finite thickness of the perfectly conducting wall; accordingly the field cannot restart outside the wall since there has been a finite region of space (occupied by the perfect conducting walls) which knows no field.

The electrical conductivity of metals is sufficiently large that the limiting conditions for perfect conductivity are approached very closely indeed and in this specification metals are regarded as being perfect conductors for the purpose in view. The metal walls of the chamber, in preventing all outflow of energy from the system, have the effect of reflecting the wave energy. If the metal walls have an inner surface of notably imperfect conductivity, then energy will be transferred from the transmitter to such walls; on first consideration, it might be thought that, if the conductivity of the walls is such that the power absorbed therein were equal to the power which would be radiated from the transmitter in the absence of the walls then there would be no reflection from the walls. However, this idea is fundamentally unsound. Power is absorbed in the imperfect conductor through the mechanism of current flow and such flow must produce electric field inside the chamber; hence the resultant field inside the chamber cannot be that due to the transmitter alone. But the internal field can be made that due to the transmitter alone if, and only if, there is disposed within the metal chamber another chamber well separated from the metal walls of the outer chamber and having appropriate conductivity.

In the essence, the condition precedent that there shall be no reflection at a barrier interposed in the path of propagation of electromagnetic waves is that the waves in question must produce, both in a metal wall and in a thin internal shell, respective sets of currents which are substantially equal in magnitude and so separated in space and phase that the resultant field due to them within the space bounded by the shell is zero.

Considering a long current filament surrounded coaxially by a thin circular cylinder of finite resistivity $\rho$, small thickness $t$ and radius $R^2$, and also by an external cylinder of perfect conductivity and radius $R^3$, then an essential condition that the field inside $R^2$ shall be that due to the current filament alone is given by the equation:

$$J_0(k_2).J_0(k_3+Y_0(k_2).Y_0(k_3)=0 \qquad (1)$$

where $$k_2=\frac{2\pi R_2}{\lambda},\ k=\frac{2\pi R_3}{\lambda}$$

$\lambda$ is the wavelength, while Jo and Yo are Bessel functions of zero order. If $R_2/\lambda$ exceeds ½, then an appropriate solution of Equation 1 is that:

$$\frac{R_3-R_2}{\lambda}=\frac{1}{4}$$

The essential geometrical condition thus tends to be that the clearance between the thin shell and the outer conducting wall shall be one quarter of the wavelength.

The second essential condition is that:

$$\frac{\lambda c \rho}{4\pi^3 R_2 t} = J_0^2(k_2) + Y_0^2(k_2) \qquad (2)$$

where symbol $c$ represents the ratio of the electromagnetic to the electrostatic unit of charge, and the other symbols have the significance hereinbefore set forth; if $R_2/\lambda$ exceeds about ½, the Expression 2 may be reduced to:

$$\frac{\rho}{t} = 120\pi \text{ ohms}$$

Such resistivity per unit area of shell is equal to the radiation resistivity of an infinite plane current sheet.

The interpretation of the system is that, for the absorption of electromagnetic waves to be complete so that there is no emission beyond, and no reflection from, the composite enclosure formed by the outer wall and internal shell, the shell should have a resistance such that the current induced in it is one half of the current which would be induced in a perfect conductor. In optical parlance half of the wave is then transmitted through the shell; with the outer wall constituted by a perfect reflector separated from the shell by a distance corresponding to one quarter wavelength, this half wave will be reflected back to the shell and on reaching the shell will have traversed a distance equal to one half wavelength and, being undiminished in strength, will thus have the effect of precisely neutralising the wave emitted by the shell into the enclosed space.

Based on the above considerations, according to the present invention, for the purpose of preventing reflection from the enclosure for a spacious room or chamber of electromagnetic waves propagated in any or all directions through the free space of the room or chamber, the enclosure is provided, either integrally or otherwise, with a metallic or other lining which is a good reflector of the waves and there is interposed in the path of incidence of the waves to said reflector, and at a distance from the latter corresponding to one quarter wavelength of the waves in question, a thin sheet or shell of imperfectly electrically conducting material having electric resistance which is of the order of $120\pi$ ohms per unit length of unit width of the material.

Whereas the invention is eminently applicable to the construction of spacious rooms or chambers whose enclosing walls are required to be non-reflecting to, or in other words not to give rise to "echo" of, electromagnetic waves generated within the room or chamber, as for instance so-called "dead" rooms or chambers often required for the testing for short-wave aerials, the principles involved are also applicable in the prevention of reflection of electromagnetic waves from discrete objects located in free space in which the electromagnetic waves are propogated.

Thus, according to the invention, for the purpose of preventing the reflection from a discrete object of electromagnetic waves propagated in any or all directions through free space in which the object is located, as for instance with a view to rendering a ship, aeroplane or other mobile or immobile structure "invisible" to location by radio echo, the object is provided either integrally or otherwise with a metallic or other covering which is a good reflector of the electromagnetic waves and there is interposed in the path of incidence of the waves to said reflector, and at a distance from the latter corresponding to one quarter of the wavelength of the waves in question, a thin sheet or shell of imperfectly electrically conducting material, namely having electric resistance which is of the order of $120\pi$ ohms per unit length of unit width of the material.

Analysis shows that, if the spacing between the imperfectly-conducting sheet or shell and the reflector is correct but the resistivity of the sheet or shell incorrect by ± ten per cent, then the internal reflection from the imperfectly-conducting sheet or shell will be about one-tenth of what would have obtained from a metal wall or other perfect conductor. If the resistivity is thirteen per cent small and the spacing fifty per cent wrong, the reflected wave will be about forty-three per cent. Hence the combination of a reflector and an imperfectly-conducting shell to provide a non-reflecting barrier is not unduly sensitive to precise adjustment and accordingly the physical requirements of this invention are such as can be attained in practice.

If the incident wave strikes obliquely the non-reflecting means of this invention, the clearance between the reflector and the imperfectly-conducting shell should be a quarter wavelength divided by the cosine of the angle between the direction of incidence and the normal. However, since the clearance adjustment is not unduly critical small obliquity of incidence will give rise to but little reflection.

In practising the invention, the imperfectly-conducting sheet or shell may be in the form of a conducting layer of the desired resistivity conveniently applied by painting or depositing colloidal graphite on paper or on a resinous or glass sheet, or any other appropriate backing of non-conducting material. A strip one foot wide of such material will have a resistance of 376 ohms per foot length when the graphite layer has the correct thickness. Such sheets can readily be made substantially uniform in resistance and constant with time.

If it is desired to reduce the physical space between the reflector and the imperfectly-conducting sheet or shell the interspace may be filled with material of high dielectric constant. Thus water has a dielectric constant near 81 for all wavelengths greater than, say, one centimetre. If the interspace were filled with water then its width should be one-ninth of one-quarter of one wavelength. Another dielectric of high constant which may be used is titanium dioxide.

Though this invention is eminently applicable in respect to the elimination of reflections of electromagnetic waves with wavelengths in the radio spectrum, it is also applicable as regards elimination of reflection of light waves, a feature of the invention being a "black" fabric consisting, for example, of metal foil on which is superposed a waxy or plastic layer of thickness one-quarter of a wavelength of monochromatic light, such as green or yellow or red light, and having a surface suitably coated with graphite; deposition of said waxy layer may be made according to methods already known per se and as applied in chemistry and optics.

Figure 1B:
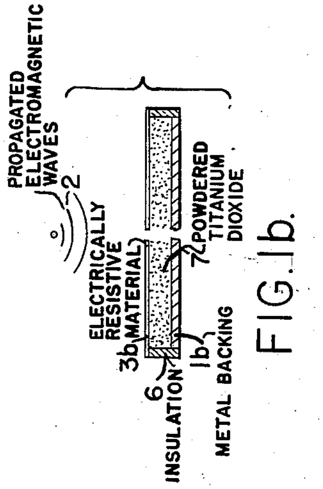
Figure 1:
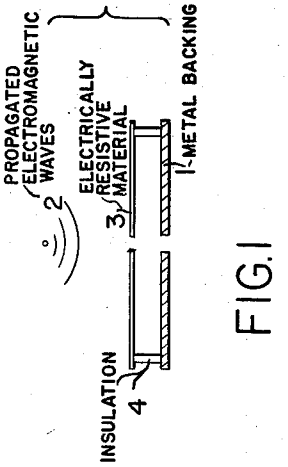
Figure 1A:
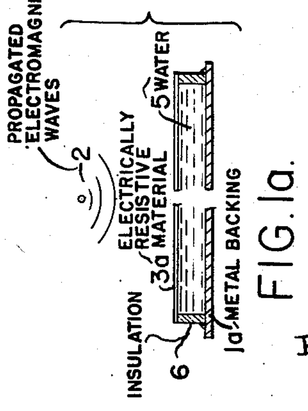

In the accompanying drawings:

Fig. 1 is a section through part of a structure according to the invention which is non-reflecting to electromagnetic waves propagated through free space in which the structure is located, while Figs. 1a and 1b are corresponding sectional views of respective modified forms of the structure of Fig. 1, and Fig. 1c is a sectional view through part of a structure which is non-reflecting to monochromatic light waves.

Figure 2:
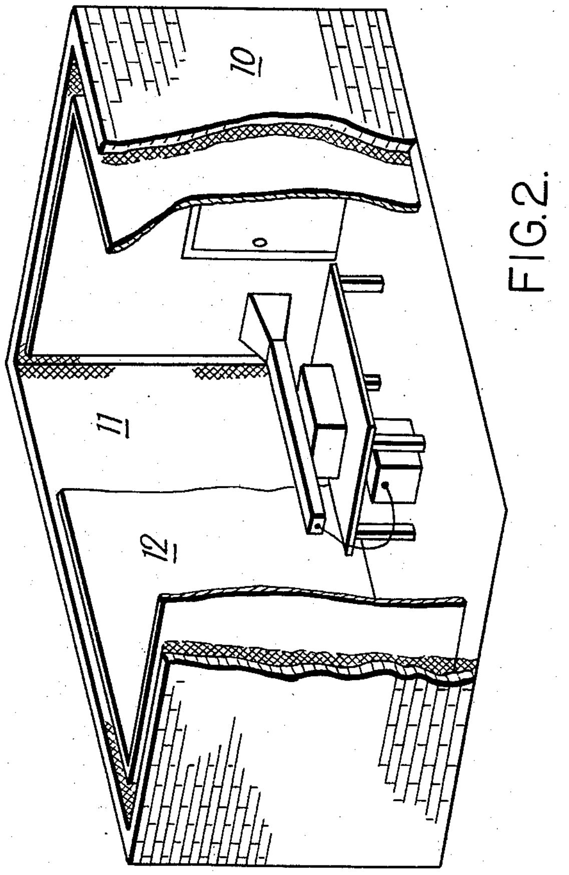

Fig. 2 is a perspective view of a non-reflecting closed or "dead" chamber according to the invention, such, for example, as may be used for the testing of very short wave aerials, the roof and other parts being broken away in the interests of better illustration.

In Fig. 1, at 1 is indicated a metal backing which is to be rendered non-reflecting to electromagnetic waves substantially of a particular frequency propagated in free space as indicated at 2. Located between the metal backing member 1 and the free space in which the waves 2 are propagated is a facing member 3 in the form of a thin shell of electrically-resistive material such for instance as a sheet of resin having a surface or embedded layer of resistive material, for example carbon, of a thickness to offer a resistance of the order of $120\pi$ ohms per unit length of unit width. The said resistive facing member 3 is supported from the backing member 1 through the intermediary of spacers 4 of insulation material so as to be physically separated from the metal backing member 1 by air space of thickness corresponding to one-quarter of a wavelength of the electromagnetic waves 2.

In the modified structure of Fig. 1a, 1a is a metal backing member and 3a is a facing member interposed between the backing member 1a and the source of the electromagnetic waves 2 in respect of which the structure is to be non-reflecting. The facing member 3a is constituted by a thin shell of electrically-resistive material of specific resistance ($\rho$) and thickness ($t$) such that $$\frac{\rho}{t}=120\pi$$

ohms per unit length of unit width. Interposed between said metal backing member 1a and said resistive facing member 3a is a laminal body of pure water 5 enclosed in a liquid-tight container formed by said members 1a and 3a and the wall 6 of insulating material. The thickness of the laminal body of water 5 is given by the quotient of one-quarter of a wavelength of the electromagnetic waves 2 and the square root of the dielectric constant of the pure water for the wavelength in question.

The structure shown in Fig. 1b is similar to that shown in Fig. 1a with the exception that the metal backing member 1b and electrically-resistive facing member 3b are separated by a laminal body of titanium-dioxide 7, in powdered form enclosed between members 1b and 3b and wall 6 of electrically-insulating material. The thickness of the laminal body of titanium-dioxide is substantially equal to the quotient of one-quarter of a wavelength of the electromagnetic waves 2 and the square root of the dielectric constant of titanium-dioxide for the wavelength in question.

Fig. 1c shows a structure which is non-reflecting to monochromatic light-waves emanating from a source designated 8. As shown the structure comprises a metal backing member 1c, which may be constituted by a sheet of metal foil, a layer 9 of translucent wax or plastic electrically-insulating material superimposed upon said backing member 1c, and a facing member 3c in the form of a film of graphite which is of thickness ($t$) such as to be small in relation to the wavelength of the light-waves 8, as for instance a painting or depositing of colloidal graphite, and such that the electrical resistance of the film is of the order of $120\pi$ ohms per unit length of unit width. The thickness of the layer 9 of insulation material is equal to the quotient of one-quarter of a wavelength of the monochromatic light waves 8 and the square root of the dielectric constant of said insulation material.

In Fig. 2 at 10 is indicated the external wall of the chamber, while 11 is an inner lining for the wall, in the form of thin wire gauze or other openwork metal sheet. Disposed within the chamber is a thin wall 12 of resinous type material incorporating a resistive layer, having a surface or embedded layer of carbon or other resistive material, the resistive layer being of a thickness to offer a resistance of the order of $120\pi$ ohms per unit length and unit width. This thin wall 12 is conveniently supported from the outer walls by spacers (not shown) such that the resistive layer of the wall is spaced from the metal lining 11 by a distance corresponding to one-quarter wavelength of the waves which are to suffer no reflection from the walls of the chamber.

What I claim as new and desire to secure by Letters Patent of the United States is:

A structure substantially non-reflecting to electromagnetic waves of predetermined frequency, comprising a backing member having a metal surface, a layer of titanium dioxide in powder form superimposed upon said metal surface and of thickness substantially equal to the quotient of one-quarter of a wavelength of said electromagnetic waves in space and the square root of the dielectric constant of titanium dioxide for the wavelength of said electromagnetic waves, together with a facing member of electrically-resistive material having electric resistance of the order of $120\pi$ ohms per unit length of unit width of said material, superimposed upon said layer of titanium dioxide.

ERIC BALLIOL MOULLIN.

REFERENCES CITED

The following references are of record in the file of this patent:

UNITED STATES PATENTS

| Number | Name | Date |
|---|---|---|
| 546,802 | Ayrton et al. | Sept. 24, 1895 |
| 1,920,741 | Bol | Aug. 1, 1933 |
| 2,106,039 | Safford | Jan. 18, 1938 |
| 2,151,118 | King et al. | Mar. 21, 1939 |
| 2,219,941 | Rochow | Oct. 29, 1940 |
| 2,235,010 | Chaffee | Mar. 18, 1941 |
| 2,296,678 | Linder | Sept. 22, 1942 |
| 2,304,540 | Cassen | Dec. 8, 1942 |

FOREIGN PATENTS

| Number | Country | Date |
|---|---|---|
| 802,728 | France | Sept. 14, 1936 |
| 22,711-35 | Australia | June 4, 1936 |